United States Patent
Kim

(10) Patent No.: US 12,190,315 B2
(45) Date of Patent: Jan. 7, 2025

(54) SYSTEMS AND METHODS FOR CONSENSUS-BASED ACCESS CONTROL FOR SMART CONTRACT FUNCTIONS

(71) Applicant: Coinbase, Inc., San Francisco, CA (US)

(72) Inventor: Peter Jihoon Kim, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 257 days.

(21) Appl. No.: 17/331,114

(22) Filed: May 26, 2021

(65) Prior Publication Data

US 2021/0374731 A1 Dec. 2, 2021

Related U.S. Application Data

(60) Provisional application No. 63/067,533, filed on Aug. 19, 2020, provisional application No. 63/029,823, filed on May 26, 2020.

(51) Int. Cl.
*G06Q 20/38* (2012.01)
*G06Q 20/02* (2012.01)
(Continued)

(52) U.S. Cl.
CPC ......... *G06Q 20/3825* (2013.01); *G06Q 20/02* (2013.01); *G06Q 20/0655* (2013.01); *G06Q 20/38215* (2013.01); *G06Q 20/405* (2013.01); *H04L 9/3239* (2013.01); *H04L 9/50* (2022.05); *H04L 2209/56* (2013.01)

(58) Field of Classification Search
None
See application file for complete search history.

(56) References Cited

U.S. PATENT DOCUMENTS 10,986,080 B1 * 4/2021 Huang .................... G06F 21/64
11,100,501 B1 * 8/2021 Rainey .................. G06Q 20/02
(Continued)

OTHER PUBLICATIONS

K. Nelaturu, A. Mavridoul, A. Veneris and A. Laszka, "Verified Development and Deployment of Multiple Interacting Smart Contracts with VeriSolid," 2020 IEEE International Conference on Blockchain and Cryptocurrency (ICBC), Toronto, ON, Canada, 2020, pp. 1-9, doi: 10.1109/ICBC48266.2020.9169428. (Year: 2020).*
(Continued)

*Primary Examiner* — Patrick McAtee
*Assistant Examiner* — Eduardo Castilho
(74) *Attorney, Agent, or Firm* — Foley & Lardner LLP

(57) ABSTRACT

Systems and methods to at least provide access control for execution of smart contract functions (methods) through consensus mechanisms are disclosed. A first smart contract is stored on a blockchain network. During execution, the first smart contract performs operations that include: aggregating a threshold number of signed blockchain transactions from authorized blockchain addresses, receiving a set of signed blockchain transactions calling a function of a target smart contract from a set of blockchain addresses, verifying that each blockchain address of the set of authorized blockchain addresses is authorized to make the call, and calling the function of the target smart contract when a number of signed blockchain transactions calling the function exceeds a threshold number.

22 Claims, 11 Drawing Sheets

(51) Int. Cl.
  *G06Q 20/06* (2012.01)
  *G06Q 20/40* (2012.01)
  *H04L 9/00* (2022.01)
  *H04L 9/32* (2006.01)

(56) References Cited

U.S. PATENT DOCUMENTS

| | | | |
|---|---|---|---|
| 11,205,178 B2* | 12/2021 | Batra | G06Q 10/0633 |
| 11,295,359 B1* | 4/2022 | Mullins | G06Q 20/202 |
| 11,455,642 B1* | 9/2022 | Jameson | G06Q 20/405 |
| 11,522,690 B2* | 12/2022 | Detres | G06Q 20/3825 |
| 11,563,585 B1* | 1/2023 | Griffin | G06Q 50/182 |
| 2017/0155515 A1* | 6/2017 | Androulaki | G06Q 20/0658 |
| 2018/0068097 A1* | 3/2018 | Collin | G06F 21/30 |
| 2018/0288022 A1* | 10/2018 | Madisetti | G06Q 20/3829 |
| 2019/0012466 A1* | 1/2019 | Ricotta | G06F 21/602 |
| 2019/0050855 A1* | 2/2019 | Martino | G06Q 20/3829 |
| 2019/0207770 A1* | 7/2019 | Zhou | G06F 21/6209 |
| 2019/0253239 A1* | 8/2019 | Shao | G06Q 10/10 |
| 2019/0268284 A1* | 8/2019 | Karame | G06F 21/604 |
| 2019/0333059 A1 | 10/2019 | Fallah et al. | |
| 2019/0342143 A1* | 11/2019 | Lin | H04L 41/0896 |
| 2020/0042998 A1* | 2/2020 | Mendhi | G06Q 20/0658 |
| 2020/0097950 A1 | 3/2020 | Thompson | |
| 2020/0169407 A1* | 5/2020 | Wei | G06F 21/31 |
| 2020/0175155 A1* | 6/2020 | Bhamidipati | G06Q 20/405 |
| 2020/0177387 A1* | 6/2020 | Qiu | G06F 16/2379 |
| 2020/0320529 A1* | 10/2020 | Lyadvinsky | G06Q 20/065 |
| 2020/0344233 A1* | 10/2020 | Lai | G06Q 20/4014 |
| 2021/0036857 A1* | 2/2021 | Qiu | H04L 9/3247 |
| 2021/0126797 A1* | 4/2021 | Peng | G06F 21/64 |
| 2021/0226774 A1* | 7/2021 | Padmanabhan | G06F 16/907 |
| 2021/0243193 A1* | 8/2021 | Padmanabhan | G06F 16/252 |
| 2022/0147995 A1* | 5/2022 | Wuest | G06Q 20/3825 |
| 2022/0188819 A1* | 6/2022 | Ognjanovic | G06Q 20/401 |
| 2022/0278830 A1* | 9/2022 | Bunshaw | G16H 40/67 |
| 2022/0300958 A1* | 9/2022 | Unagami | G06Q 20/389 |
| 2022/0405765 A1* | 12/2022 | Bekiyants | G06Q 20/3829 |
| 2023/0041182 A1* | 2/2023 | Fujii | G06F 16/182 |
| 2023/0065259 A1* | 3/2023 | Chen | G06F 21/554 |
| 2023/0216833 A1* | 7/2023 | Covaci | G06V 10/7557 |
| | | | 713/171 |

OTHER PUBLICATIONS

Buterin et al., "Ethereum White Paper—A Next-Generation Smart Contract and Decentralized Application Platform,", 2019, retrieved from https://web.archive.org/web/20191224043000/https://github.com/ethereum/wiki/wiki/White-Paper (Year: 2019).*

B. Liu, S. Sun and P. Szalachowski, "SMACS: Smart Contract Access Control Service," 2020 50th Annual IEEE/IFIP International Conference on Dependable Systems and Networks (DSN), Valencia, Spain, 2020, pp. 221-232, doi: 10.1109/DSN48063.2020.00039. (Year: 2020).*

W. Dai, C. Wang, C. Cui, H. Jin and X. Lv, "Blockchain-Based Smart Contract Access Control System," 2019 25th Asia-Pacific Conference on Communications (APCC), Ho Chi Minh City, Vietnam, 2019, pp. 19-23, doi: 10.1109/APCC47188.2019.9026509. (Year: 2019).*

J. P. Cruz, Y. Kaji and N. Yanai, "RBAC-SC: Role-Based Access Control Using Smart Contract," in IEEE Access, vol. 6, pp. 12240-12251, 2018, doi: 10.1109/ACCESS.2018.2812844. (Year: 2018).*

T. Cai, Z. Yang, W. Chen, Z. Zheng and Y. Yu, "A Blockchain-Assisted Trust Access Authentication System for Solid," in IEEE Access, vol. 8, pp. 71605-71616, 2020, doi: 10.1109/ACCESS.2020.2987608. (Year: 2020).*

C. Li and B. Palanisamy, "Decentralized Privacy-Preserving Timed Execution in Blockchain-Based Smart Contract Platforms," 2018 IEEE 25th International Conference on High Performance Computing (HiPC), Bengaluru, India, 2018, pp. 265-274, doi: 10.1109/HiPC.2018.00037. (Year: 2018).*

McCorry et al., "A Smart Contract for Boardroom Voting with Maximum Voter Privacy," In: Kiayias, A. (eds) Financial Cryptography and Data Security, 2017, Lecture Notes in Computer Science(), vol. 10322. Springer, Cham. https://doi.org/10.1007/978-3-319-70972-7_20 (Year: 2017).*

OpenZepellin, "Access control," retrieved from The Wayback Machine—https://web.archive.org/web/20200518211320/https://docs.openzeppelin.com/contracts/3.x/access-control , 2020, (Year: 2020).*

Cañada, "How To Use AccessControl.sol," retrieved from The Wayback Machine—https://web.archive.org/web/20200427032039/https://medium.com/coinmonks/how-to-use-accesscontrol-sol-9ea3a57f4b15 , 2020, (Year: 2020).*

Nov. 8, 2021—(WO) ISR & WO—Application No. PCT/US2021/46506.

Kim, Pete , et al., "Centre Fiat Token", https://github.com/centrehq/centre-tokens/blob/master/doc/tokendesign.md, May 12, 2020.

Kim, Pete , "Multi-Sig Admin Contract", https://github.com/CoinbaseStablecoin/multi-sig-admin, Jul. 22, 2020.

Chenglong Fu et al: "Towards Efficient Integration of Blockchain for IoT Security: The Case Study of IoT Remote Access", Arxiv. Org, Cornell University Library, 201 Olin Library Cornell University Ithaca, NY 14853, Nov. 30, 2019 (15 pages).

European Search Report on EP Appl. Ser. No. 21859060.2 Dated Aug. 9, 2024 (8 pages).

Qinghua Lu et al: "uBaaS: A Unified Blockchain as a Service Platform", Arxiv.Org, Cornell University Library, 201 Olin Library Cornell University Ithaca, NY 14853, Jul. 31, 2019 (30 pages).

* cited by examiner

SYSTEMS AND METHODS FOR CONSENSUS-BASED ACCESS CONTROL FOR SMART CONTRACT FUNCTIONS

CROSS-REFERENCE TO RELATED APPLICATIONS

This application claims the benefit of U.S. Provisional Application No. 63/029,823 filed 26 May 2020, and US Provisional Application No. 63/067,533 filed 19 Aug. 2020, each of which is incorporated herein in its entirety for all purposes.

TECHNICAL FIELD

This invention relates generally to the smart contact field, and more specifically to a new and useful system and method for managing security for smart contracts.

BACKGROUND

There is a need in the data field to provide improved security for smart contracts.

DESCRIPTION OF THE PREFERRED EMBODIMENTS

Figure 1A:
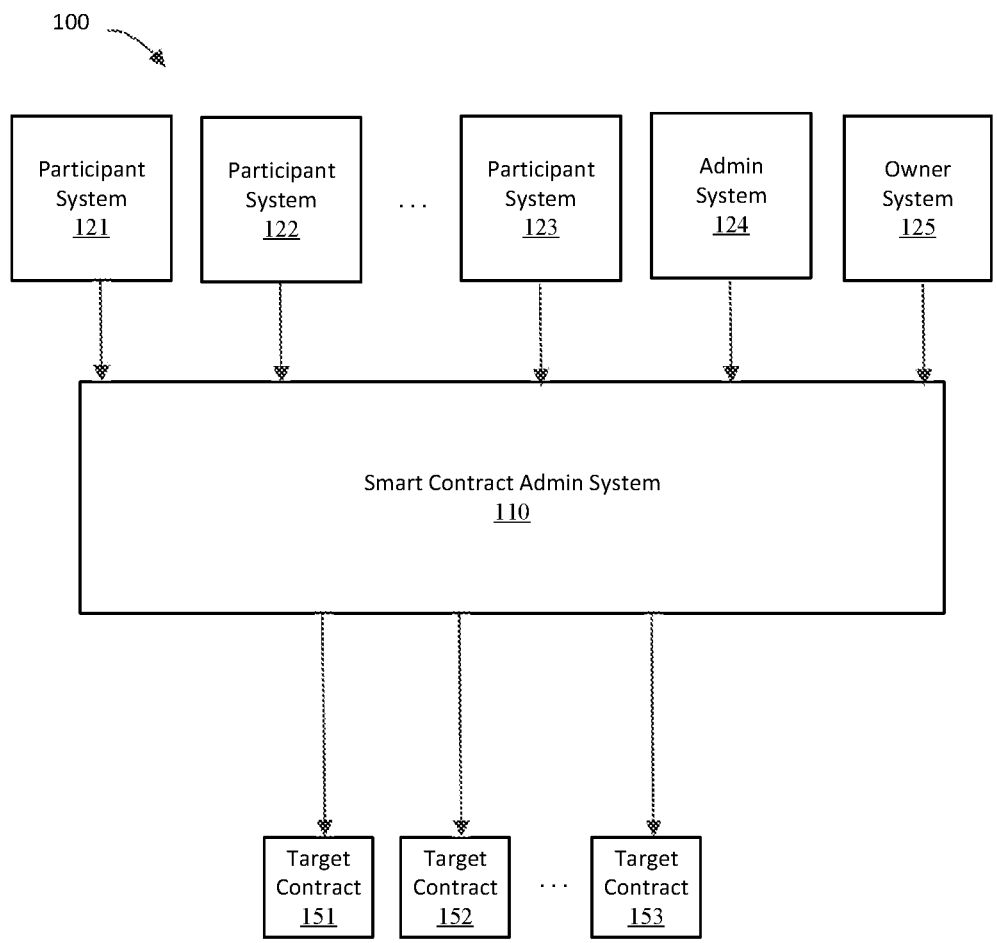
FIGS. 1A-E are schematic representations of the system, in accordance with various embodiments.

The following description of the preferred embodiments is not intended to limit the invention to these preferred embodiments, but rather to enable any person skilled in the art to make and use this invention.

1. Overview

Smart contracts typically implement one or more functions that can be invoked by broadcasting a signed transaction to a blockchain that manages the smart contract. The transaction can identify the function to be invoked, and any function arguments (parameters). The transaction is typically signed by using a private key associated with a blockchain address or account. In many cases, the private key used to invoke smart contract functions can also be used to sign transactions that transfer assets managed by the blockchain. In some cases, there is no requirement that a function execution blockchain transaction be signed by a particular private key, meaning that anyone who possesses a private key of a valid blockchain address can execute the smart contract function.

However, for some smart contract functions, it is desirable to limit access to the functions execution. For example, for token contracts (e.g., contracts that manage ERC-20 compatible tokens, etc.), it is desirable to restrict access to token management functions to a limited set of trusted participants. In such a case, the smart contract can require that some function execution transactions be signed using a private key that is accessible by one or more authorized entities.

The system and method provide configurable access control for execution of smart contract functions (methods). In a first variation, the system is a smart contract that implements one or more functions, and also implements access control for at least one implemented function (e.g., of a target smart contract). In a second variation, the system functions to proxy smart contract function execution requests received from eligible participants to one or more smart contracts by performing access control. The system itself can be implemented as a smart contract, or otherwise implemented.

In variants, the method functions to perform access control for execution of smart contract functions. The method can include configuring access control (e.g., identifying participants that can perform function execution) for at least one smart contract function. In some variations, for at least one function, execution of the function can be restricted to one or more participants, and any one of the allowed participants can invoke the function (without consensus from other participants). In some variations, consensus-based access control is implemented for at least one smart contract function. The method can include proposing execution of at least one smart contract function, and execution of at least one smart contract function (e.g., if a required number of votes have been received from eligible voters).

2. Benefits

The system and method can confer several benefits over existing systems and methods.

First, by virtue of assigning roles of a target smart contract to the administration system, as described herein, consensus-based access control can be provided for execution of functions implemented by the target smart contract. This enables control of the target smart contract to be adjusted without changing the code of the target smart contract (e.g., after the target smart contract's roles and/or administrators are changed to the administrator smart contract's address). Changing the target smart contract's code can be undesirable because the change is difficult to audit, difficult to debug, and can result in costly and disastrous results (e.g., DAO's 2016 smart contract bug, resulting in a loss of 3.6 million ETH, or Parity's November 2017 smart contract bug, immobilizing over 1 million ETH).

Second, by virtue of assigning configuration and voting roles to different participants, security can be improved. For example, since voters cannot add more eligible voters for a smart contract function, voters cannot collude to add malicious voters.

Third, by adding consensus based access control, security can be maintained even if a participant's private key is compromised.

Fourth, by adding consensus based access control, functions can be executed even if a participant loses their private key needed to vote for function execution.

However, further advantages can be provided by the system and method disclosed herein.

3. System

The system functions to provide access control for execution of smart contract functions (methods). The system itself can be implemented as a smart contract, or otherwise implemented.

FIGS. 1A-E are schematic representations of a system 100, in accordance with various embodiments.

In a first variation, the system includes a smart contract (e.g., 151-153 of FIG. 1A) that implements one or more functions, and also implements access control for at least one implemented function. For example, as illustrated in FIGS. 1A-E the smart contract can include a smart contract administration system (admin system) 110 that functions to perform access control (e.g., as shown in FIG. 1E). Participant systems can access the smart contract directly, or indirectly via an interface 111 (e.g., an API, a graphical user interface, a web application, etc.).

In a second variation, the system functions to proxy smart contract function execution requests received from eligible participants (e.g., 121-123 shown in FIG. 1A) to one or more target smart contracts (e.g., 151-153 shown in FIG. 1A) by performing access control. In variants, target smart contracts are smart contracts for which access control is performed by the system 100. The system can include a smart contract administration system 110 that functions to perform access control. The smart contract administration system 110 can be an off-chain system (e.g., as shown in FIG. 1B), an on-chain system (e.g., as shown in FIG. 1C), or a combination of on-chain (e.g., admin smart contract 112) and off-chain (e.g., interface 111) systems (e.g., as shown in FIG. 1D).

Figure 1B:
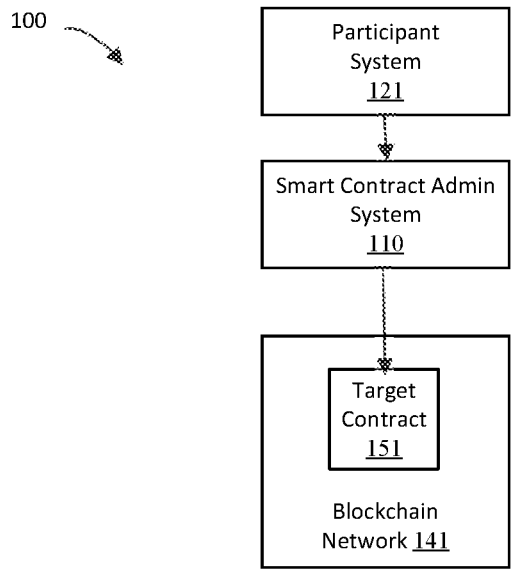
Figure 1C:
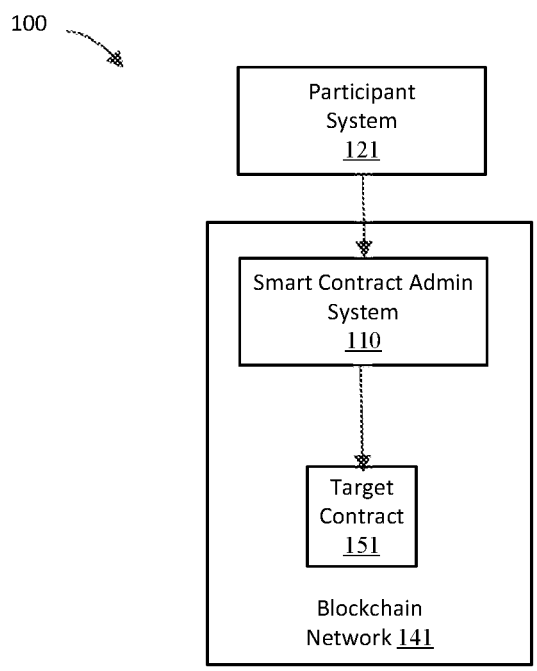
Figure 1D:
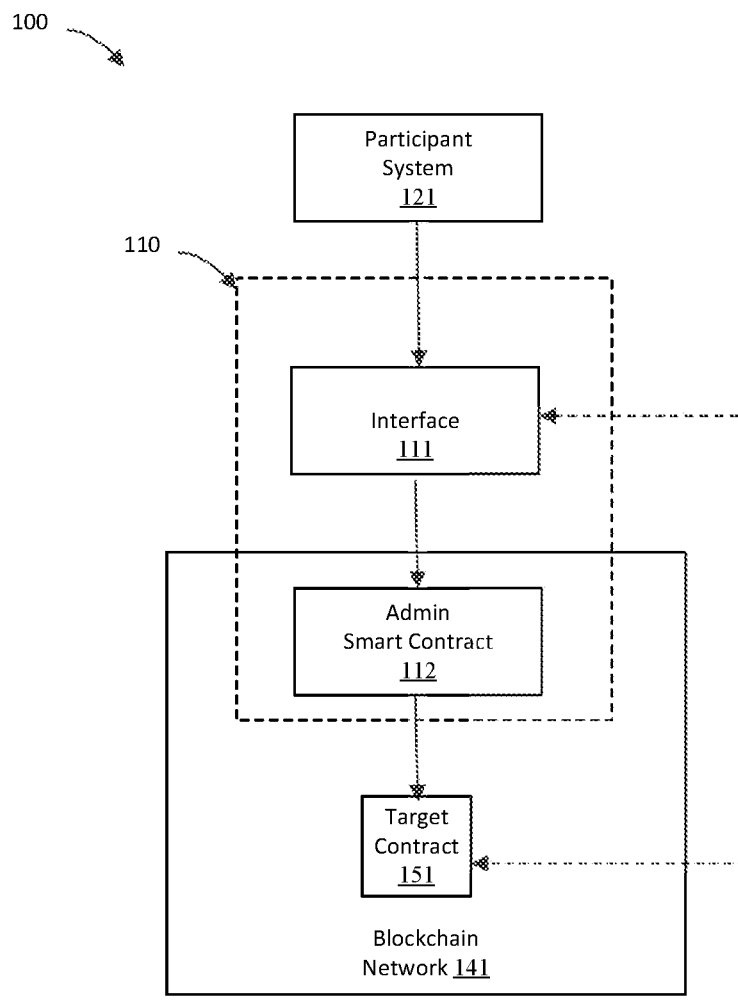
Figure 1E:
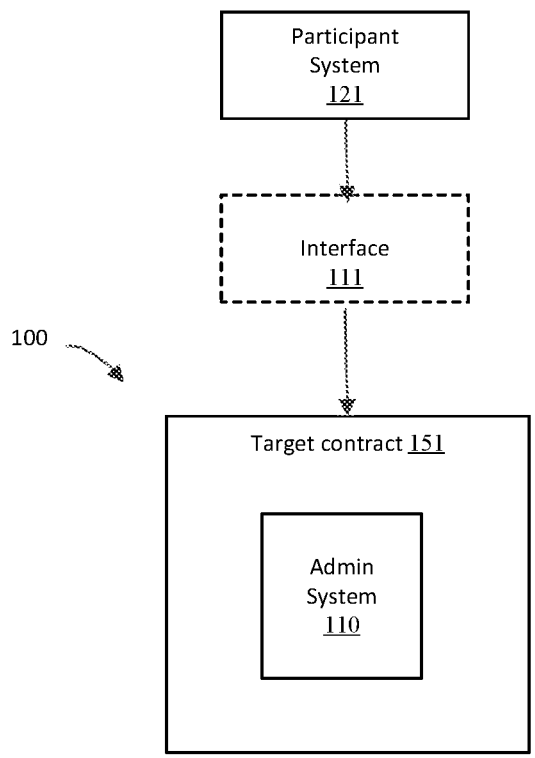

In variants, the smart contract administration system 110 can provide access control for several smart contracts (e.g., 151-153 in FIG. 1A). The smart contracts can be on a same blockchain network (e.g., 141 as illustrated in FIG. 1B, FIG. 1C, and FIG. 1D), or included in several different blockchain networks (e.g., Ethereum, EOS, etc.).

In variants, the smart contract administration system 110 can receive input (e.g., via an interface) from at least one of: a participant system (e.g., 121-123), an owner system (e.g., 125), and an administrator system (e.g., 124). Additionally, or alternatively, one or more of a participant system (e.g., 121-123 of FIG. 1A), an owner system (e.g., 125 of FIG. 1A), and an administrator system (e.g., 124 of FIG. 1A) can sign a transaction that invokes a smart contract function implemented by the smart contract administration system (e.g., in variants in which the system 110 is implemented as a smart contract).

Figure 1F:
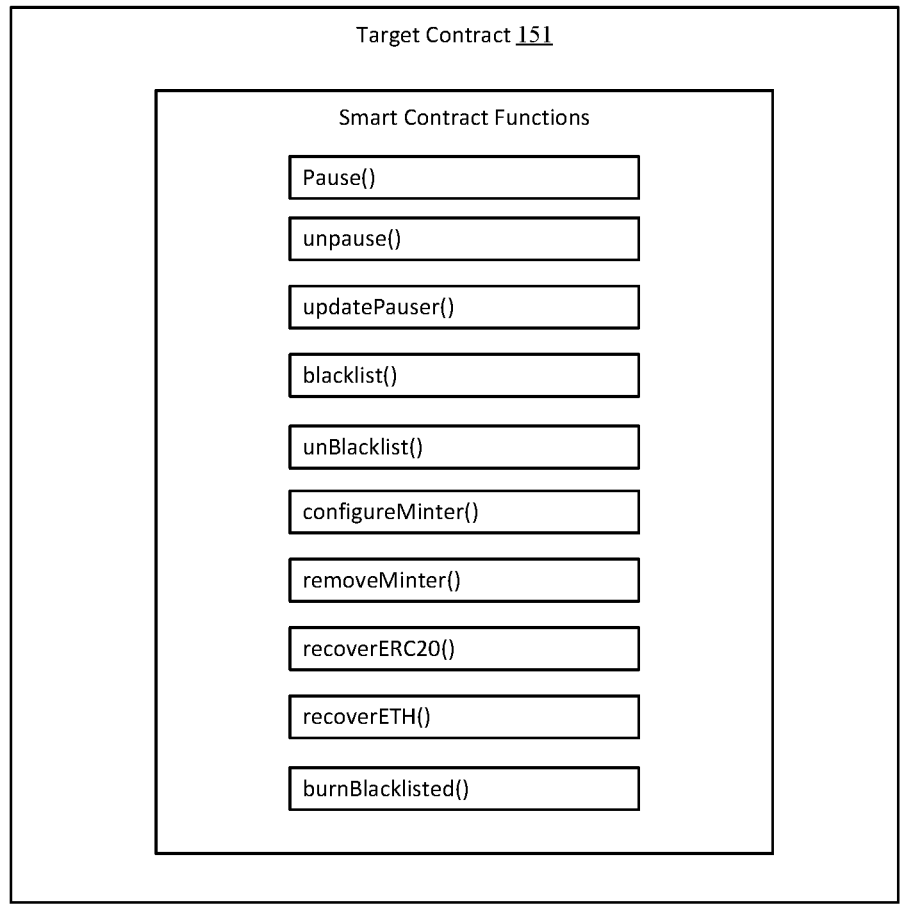
FIG. 1F is a schematic representation of a target smart contract, in accordance with various embodiments.

FIG. 1F shows example smart contract functions included in a target smart contract 151.

In variants, at least one target contract (e.g., 151), implements at least one function that can only be invoked by a transaction made from a predefined address that corresponds to a specific private key or smart contract address (e.g., as determined from the msg.sender of the transaction). In some implementations, the target contract can be configured such that function can only be invoked by a transaction made by a smart contract address of the smart contract administration system 110 (e.g., a smart contract address of the admin smart contract 112). In some implementations, the target contract (e.g., 151) has a number of roles (addresses) which control different functionality. For example, roles can be assigned to a set of one or more functions implemented by the target contract, and an address (e.g., an externally owned account address, a smart contract address, etc.) can be assigned to each role.

In an example, target contract is a token smart contract that has the following roles: master, minter, minter, pauser, blacklister, owner, and administrator. The master minter adds and removes minters and increases their minting allowance. Minters create and destroy tokens. A pauser pauses the contract, which prevents all transfers, minting, and burning. A backlister prevents all transfers to or from a particular address, and prevents that address from minting or burning. An owner can reassign any of the roles except for admin. An admin can upgrade the contract and re-assign itself. In some implementations, the target smart contract implements at least one standard method/function of the ERC-20 interface. Additionally, or alternatively, the target smart contract can implement at least one extended method/function of the ERC-20, interface. In an example, a blacklisted address will be unable to call transfer( ), transferFrom( ), or approve( ), and will be unable to receive tokens; transfer( ), transferFrom( ), and approve( ), will fail if the contract has been paused.

In some implementations, the token smart contract allows multiple entities to create and destroy tokens. Each minter can have a mintingAllowance, which can be configurable. The mintingAllowance identifies how many tokens that a minter may issue, and as a minter issues tokens, its mintingAllownce declines.

Minters can be added via the configureMinter( ) function. When a minter is configured a mintingAllowance is specified, which is the number of tokens that address is allowed to mint. As a minter mints tokens, the mintingAllowance will decline. In an example, only the masterMinter role may call configureMinter. When a minter's allowance is low, configureMinter can be called to reset the mintingAllowance to a higher value.

Minters can be removed via the removeMinter function. This will remove the minter from the list of minters and set its mintingAllowance to zero. Once a minter is removed, it will no longer be able to mint or burn tokens. In variants, only the masterMinter role may call removeMinter.

In variants, a minter mints tokens via the mint function. The minter specifies the amount of tokens to create and a To address which will own the newly created tokens. A minter may only mint an amount less than or equal to its minting allowance. The minting allowance will decrease by the amount of tokens minted; and the balance of the To address and total supply will each increase by amount of tokens minted. In some implementations only a minter may call the minting function. In some implementations, minting fails when the contract is paused. In some implementations, minting fails when the minter or the To address is blacklisted. In some implementations, the minter emits a Mint event and a Transfer event.

In variants, a minter burns tokens via the burn function. The minter specifies the amount of tokens to burn, and the minter must have a balance greater than or equal to the amount. Burning tokens is restricted to the minter addresses to avoid accidental burning of tokens by end users. A minter with a mintingAllowance of zero is allowed to burn tokens. A minter can only burn tokens which it owns. When a minter burns tokens, its balance and the totalSupply are reduced by the amount. In variants, burning tokens will not increase the mintingAllowance of the address doing the burning.

In variants, only a minter may call the burn function. In some implementations, burning fails when the contract is paused, or when the minter is blacklisted. In some implementations, burning emits a burn event and a transfer event.

In variants, the token smart contract can blacklist addresses. Blacklisted addresses are unable to transfer tokens, approve tokens, mint tokens, or burn tokens. Addresses can be blacklisted by using the blacklist function of the token smart contract. In variations, only a blacklister role can call the blacklist function.

In variants, the token smart contract implements an unblacklist function that removes an account from a blacklist. In variants, only a blacklister roll can call the unblacklist function.

In variants, the token smart contract implements a pause function that can be called to pause the token smart contract. Pausing can be performed in cases of a serious bug, or key compromise. Al transfers, minting, burning, and adding minters will be prevented while the contact is paused. Other functionality, such as modifying the blacklist, removing minters, changing roles, and upgrading can remain operational, as those functions might be required to fix or mitigate the issue that caused the pausing of the contract. In variants, the token smart contract can implement an unpause function that can be called by the pauser role.

In variants, the token smart contract implements an upgrade function that can be called to upgrade the token smart contract. In variants, only the admin role can call the upgrade function.

However, the target smart contract can be: a distributed application (e.g., DApp, such as Cryptokitties™), an ERC-20 token smart contract, and/or any other suitable smart contract (e.g., on the Ethereum blockchain or a different blockchain).

Figure 1G:
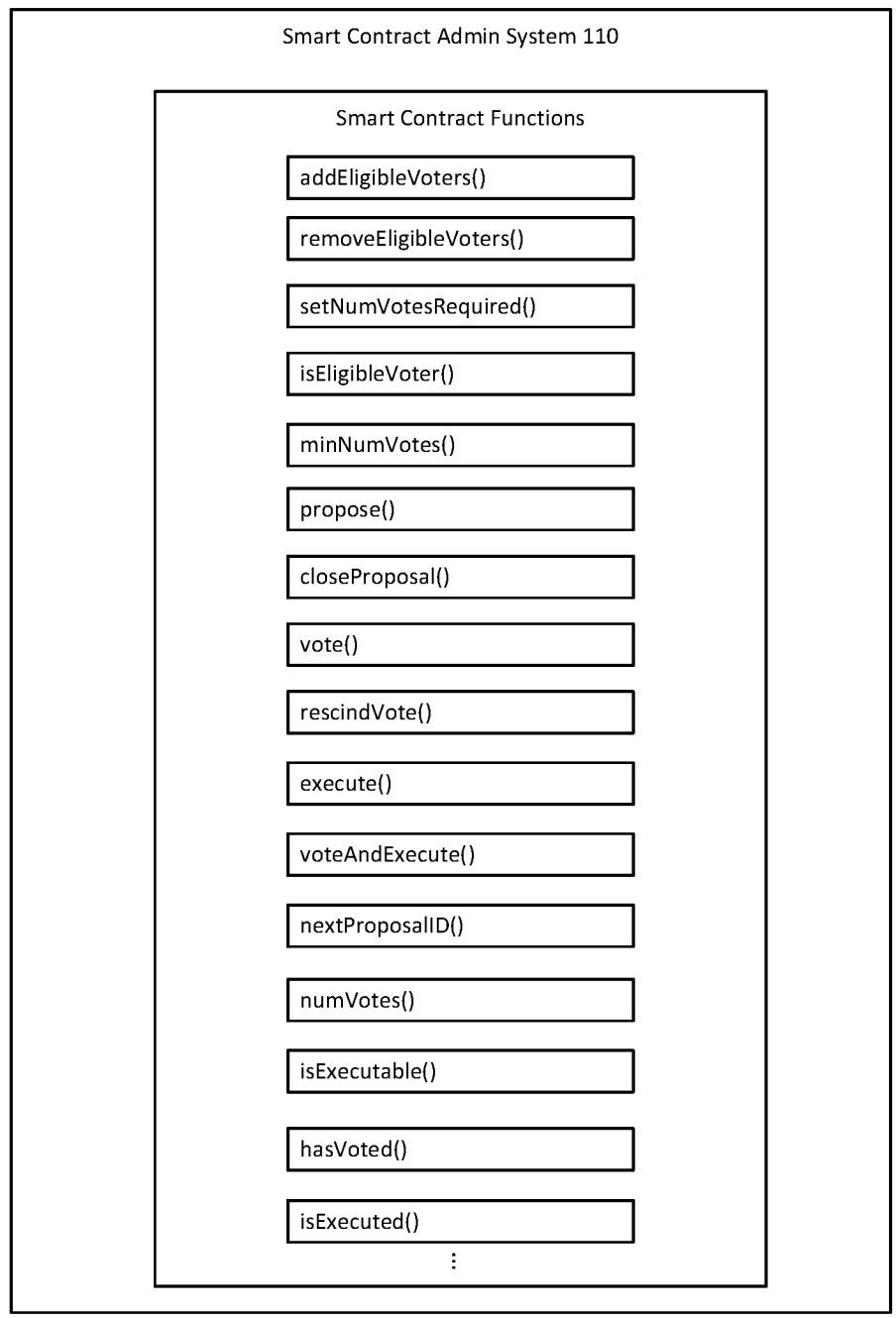
FIG. 1G is a schematic representation of an administration smart contract, in accordance with various embodiments.

FIG. 1G shows example smart contract functions included in a smart contract administration system 110 that is implemented as a smart contract.

Participant systems, admin systems, and owner systems can be any suitable type of computing system (e.g., mobile device, laptop, server, embedded computing system, wearable device, etc.).

The interface in functions to provide a more user-friendly interface for configuring smart contract administration system no, as compared to configuring smart contract administration system no using a low-level interface (such as a native smart contract interface). In variants, the interface 111 can include any suitable type of API module for receiving API requests, processing received API requests to generate API responses, and providing generated API responses. In variants, the interface 111 can include a user interface. In variants, the interface 111 can be implemented as an on-chain interface, or a combination of on-chain and off-chain interfaces. However, the interface can otherwise be implemented.

In some variations, one or more of the components of the system are implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in a hardware device are communicatively coupled via a bus. In some variations, one or more components included in the hardware device are communicatively coupled to an external system via the communication interface.

The communication interface functions to communicate data between the hardware device and another device via a network (e.g., a private network, a public network, the Internet, and the like).

In some variations, the storage device includes the machine-executable instructions for performing at least a portion of the method 200 described herein.

In some variations, at least one component of the system performs at least a portion of the method 200 described herein.

4. Methods

Figure 2A:
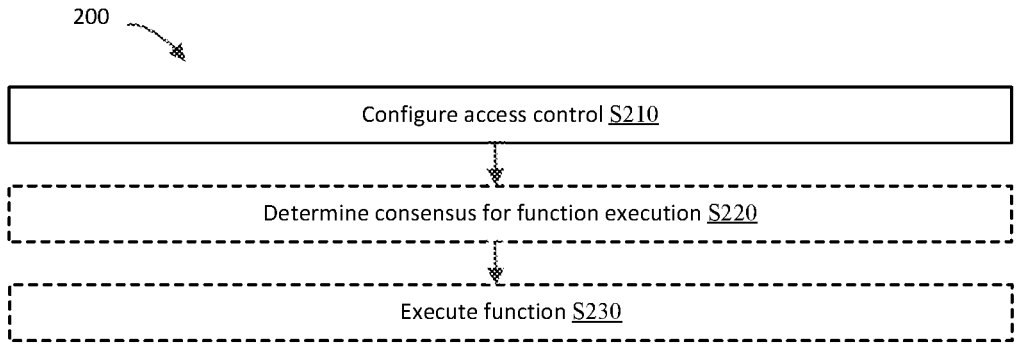
FIGS. 2A-C are representations of the method, in accordance with various embodiments.
Figure 2B:
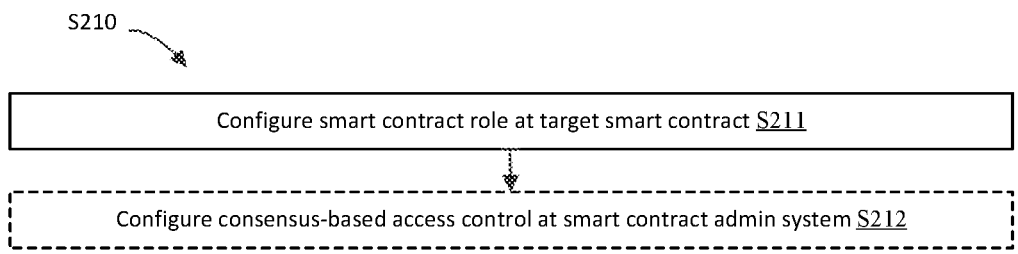
Figure 2C:
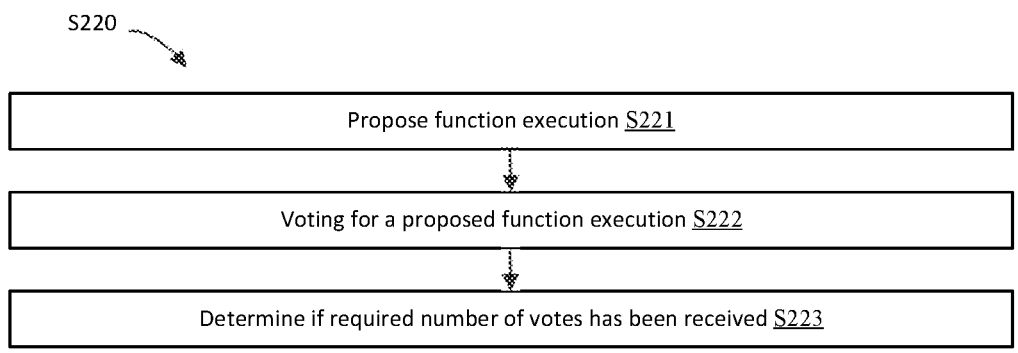

FIGS. 2A-C are representations of the method in accordance with embodiments.

In some variations, as shown in FIG. 2A, the method (e.g., 200) includes configuring access control S210 (e.g., by invoking functions of a target smart contract, by invoking functions of an administration smart contract, by processing API calls at smart contract administration systems, etc.). The method can optionally include one or more of determining consensus for function execution S220, and executing a function S230.

As shown in FIG. 2B, configuring access control S210 can include configuring at least one role of at least one target smart contract S211. In variants, the roles of the target smart contract can be configured at any suitable time, and in response to any suitable trigger. In some implementations, only an owner or administrator of the target smart contract can configure the roles. However, roles can be configured in any suitable manner.

Configuring a role of a target smart contract can include one or more of: defining one or more roles, assigning a role to one or more smart contract functions, and assigning participant identifiers to one or more roles. Roles can function to provide access control by defining a set of participants that can invoke function calls of the smart contract, and defining which function calls each participant can invoke. During processing of a function call by the target smart contract, the target smart can identify a participant associated with the function call (e.g., by address, digital signature, etc.), and permit the function to be executed only if the identified participant is authorized to execute the function (e.g., as identified by a role definition).

Any number of roles can be defined. In an example of a token contract (e.g., for USDC), roles can include master minter, minter, pauser, blacklister, owner, and administrator. In variants, one or more participants can be assigned to each role.

In some implementations, participants assigned to a role are identified by a blockchain address. The blockchain address (or account) can be the address of an externally owned account (EOA), or a smart contract address. The address can be derived from an elliptic-curve key pair, or otherwise derived. In variants, EAO accounts are indistinguishable from smart contracts in terms of address format, and this property allows smart contracts to accept both EOA addresses or smart contract addresses for role assignments.

Additionally, or alternatively, participants assigned to a role can be identified by a signing public key. The target smart contract can require that all function execution blockchain transactions include a digital signature that can be verified by using the signing public key assigned to the role for the corresponding function. However, participants can otherwise be identified in a role assignment.

Figure 5:
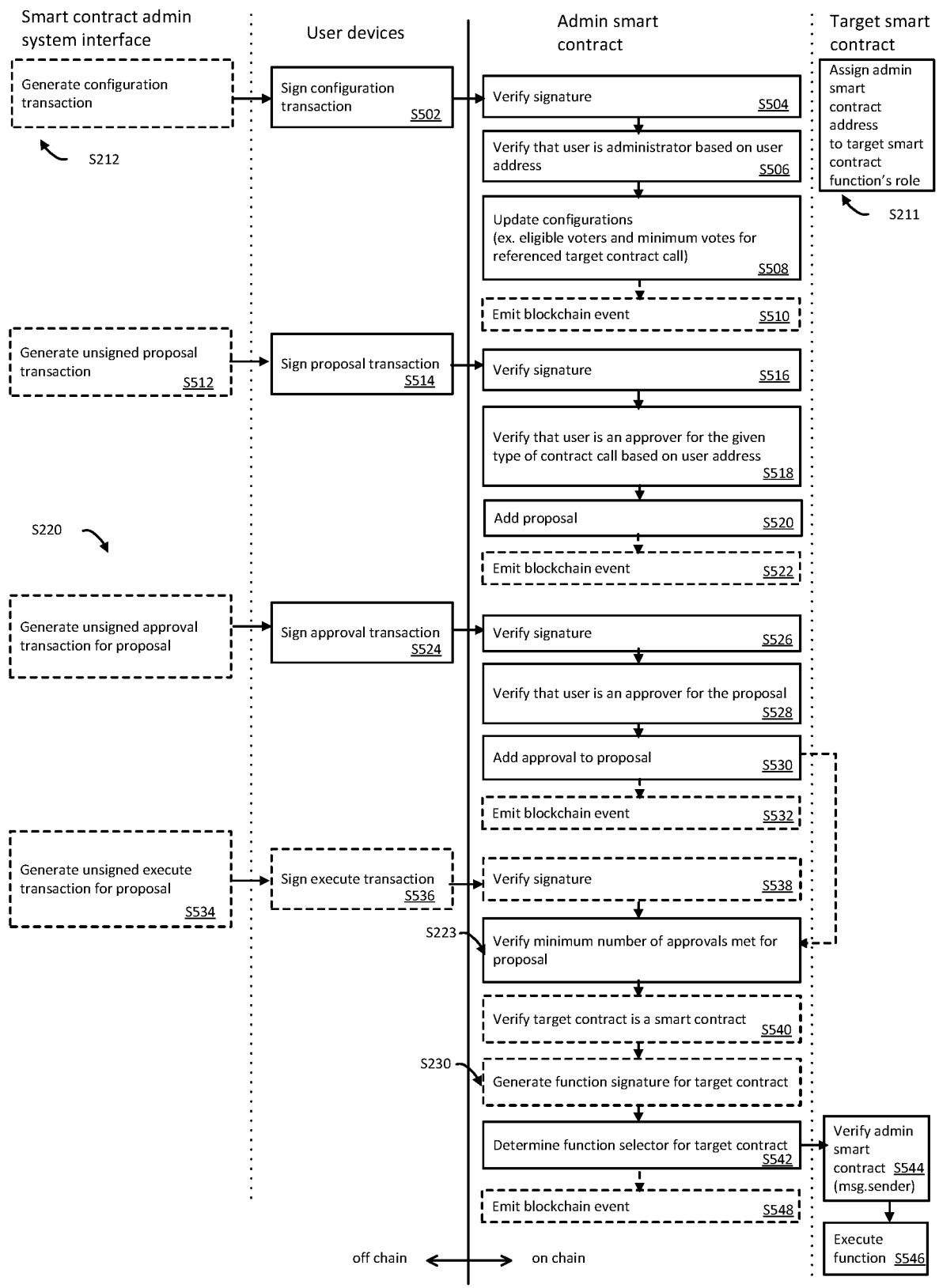
FIG. 5 is a schematic representation of an example of proposal, voting, and voting execution, in accordance with various embodiments.

In variants, the smart contract administration system 110 is assigned to at least one role of the target smart contract as a participant (e.g., by using a smart contract address of smart contract administration system 110, by using a signing public key of smart contract administration system 110, etc.), example shown in FIG. 5. In some implementations, smart contract administration system 110 can automatically execute target smart contract functions that are assigned the smart contract administration system's role at the target smart contract. For example, smart contract administration system 110 can execute a function periodically, in accordance with rules, in response to a request, in response to one or more triggers, or at any other suitable time.

Alternatively, smart contract administration system 110 executes target smart contract functions in response to consensus-based approval (e.g., implemented using a multi-signature voting process), an example of which is shown in FIG. 5. In this manner, smart contract administration system 110 can provide multi-signature functionality for execution of the target smart contract's functions, without modifying the target smart contract's code.

As shown in FIG. 2A, configuring access control S210 can include configuring consensus-based access control at the admin system S212. Consensus-based access control can be configured for one or more target smart contracts (e.g., 151-153). The target smart contracts can be executed by the same blockchain, or executed by a plurality of blockchains. Target smart contracts can implement one or more functions, and consensuses-based access control can be configured for any smart contract function.

In variants, configuration of consensus-based access control at smart contract administration system 110 is restricted to authorized participants or roles. In some implementations, smart contract administration system 110 has an owner role, and one or more administrator (admin) roles. The owner is permitted to add or remove admins, and change the owner. In some implementations, changing admins or owners can be subject to consensus-based access control (e.g., by using smart contract administration system 110). Each admin is permitted to configure consensus-based access control for one or more smart contract functions.

In a first example, smart contract administration system 110 functions to provide access control for a single target smart contract, and the owner can add one or more admins that are authorized to configure access control for the target smart contract (e.g., a USDC token contract).

In a second example, smart contract administration system 110 provides a multi-tenant access control platform that provides access control for any number of target smart contracts as discussed in more detail below.

Figure 3A:
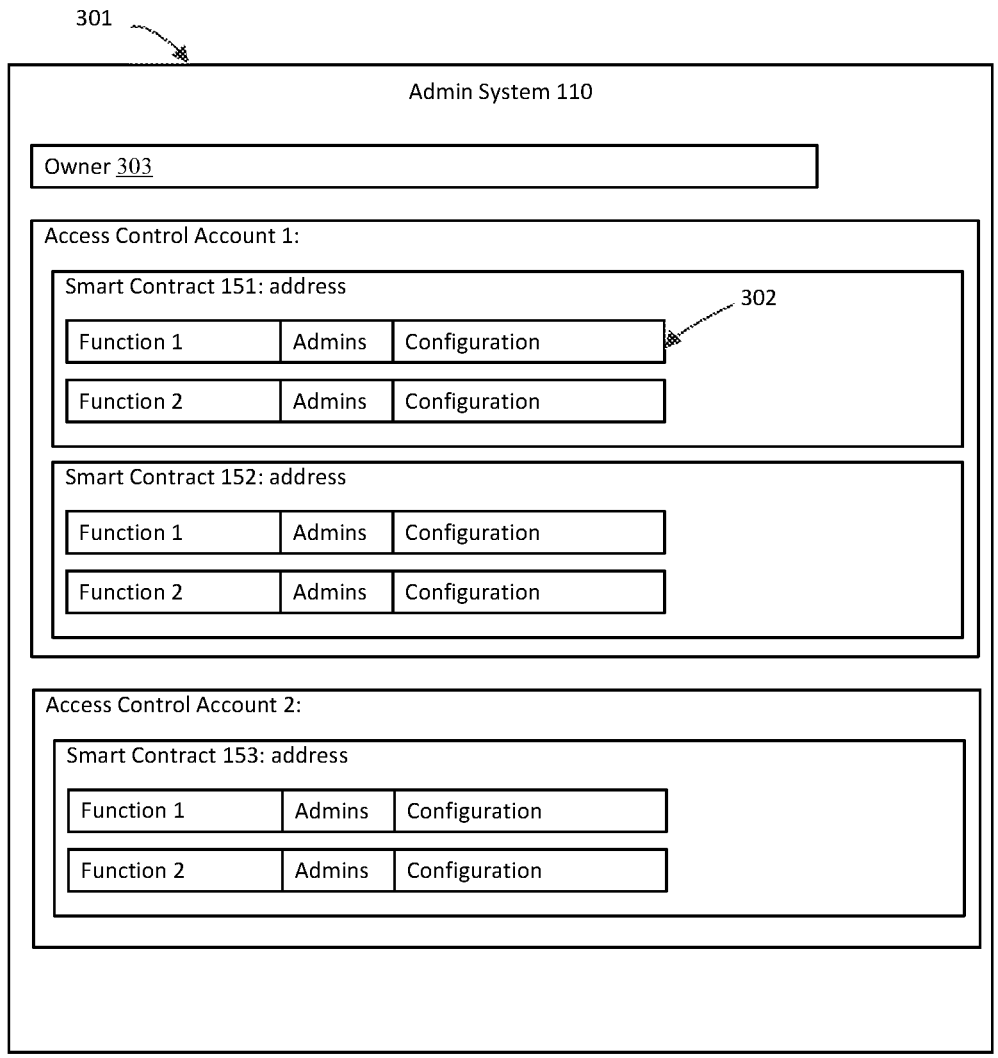
FIGS. 3A-B are representations of admin system configuration, in accordance with various embodiments.
Figure 3B:
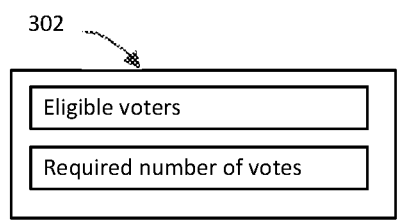

FIGS. 3A and 3B show exemplary configuration 301 of a multi-tenant admin system 110 that has several platform accounts, each account managing a respective set of smart contracts. The owner of a target smart contract can create an access control account at smart contract administration system 110, and the owner 303 of smart contract administration system 110 can add one or more admins for the access control account. Each of these admins can configure access control for the target smart contract associated with the access control account, by using smart contract administration system 110. An owner of the access control account can request the owner of smart contract administration system 110 to add or remove admins as needed (e.g., via a user interface, API, customer service call, etc.). In an example, an owner of an access control account can configure access control for one or more smart contracts. For each managed smart contract, the access control account owner can configure access control for one or more functions. Administrators can be assigned to each smart contract, or for individual (or groups of) smart contract functions. An administrator for a function can add or update configuration (e.g., 302) for the function.

In an example, configuring consensus-based access control at the admin system S212 for a target smart contract function includes defining consensus-based access control configuration information (e.g., 302 shown in FIGS. 3A-B). In variants, configuration information identifies one or more of: a smart contract function, the associated target smart contract, and consensus-based access control parameters for the function. In variants, consensus-based access control parameters include one or more of: identities of eligible consensus voters, and a required number of voters. In variants, the target smart contract can be an admin smart contract (e.g., 112) used by smart contract administration system 110, and access control can be configured for one or more functions of the admin smart contract.

The smart contract administration system 110 (e.g., admin smart contract 112) can include (e.g., store, enforce, enact, etc.) different configurations for: different functions of the admin smart contract, different target smart contracts, different target smart contract functions, different blockchain actions, and/or other modules or control targets. Different configurations can have: different sets of authorized addresses (e.g., cryptocurrency addresses; eligible voters or approvers; etc.), different acceptance requirements (e.g., different signature thresholds or consensus thresholds, different proposal vote thresholds, different approval vote thresholds, different proposal expiration times, different location requirements, etc.), different execution requirements (e.g., different execution times, different execution schedules, different execution logic, different execution target contracts, different execution target contract functions or function signatures, etc.), and/or otherwise vary.

For example, the smart contract administration system can require a unanimous vote from a first set of approvers before calling a first target contract function (e.g., a sensitive function, such as minting or pausing the target contract), and require a subset of votes from a second set of approvers before calling a second target contract function (e.g., a reversible function, such as blacklisting a cryptocurrency address). The first and second target contract functions can be from the same or different target contract. The first and second set of approvers can be the same or different (e.g., entirely different, include overlapping addresses, etc.).

In a second example, the smart contract administration system (e.g., admin smart contract) can automatically call a first target contract function on a first schedule (e.g., every B mined blocks) after the respective approval conditions are met a single time, and call a single instance of the second target contract function each time the respective approval conditions are met.

The configurations for each control target (e.g., admin smart contract function, target contract, target contract function, etc.) can be: automatically specified, manually specified (e.g., using signed blockchain messages received from a threshold number of addresses authorized to change the configurations), be a default, be specified as a batch (e.g., wherein the configurations for all functions of a target contract can inherit the configurations of the target contract), be specified individually, and/or otherwise specified.

In some variations, smart contract administration system 110 receives configuration information for configuring consensus-based access control via an interface (e.g., a user interface, an off-chain API, a smart contract interface, etc.). In a first example, smart contract administration system 110 is an off-chain system (e.g., as shown in FIG. 1B), and smart contract administration system 110 receives configuration information via one of a user interface and an off-chain API. In a second example, smart contract administration system 110 is an on-chain smart contract (e.g., as shown in FIG. 1C), and smart contract administration system 110 receives configuration information via the on-chain smart contract's interface. In a third example, smart contract administration system 110 includes an interface 111, and an on-chain smart contract 112 (e.g., as shown in FIG. 1D). The interface 111 receives the configuration information from a participant system (e.g., 121), and the interface 111 provides the configuration to the smart contract 112 via the smart contract's on-chain interface. In an example, the interface receives the configuration information and generates an unsigned smart contract transaction (example shown in FIG. 5) that can then be downloaded and sent to an air-gapped machine for signing and then broadcasting to a blockchain network. The private key(s) used to sign such transactions can be managed in any suitable secure manner (e.g., using hardware security modules, cold storage, multi-signature, multi-party computation, etc.).

By providing a user interface (e.g., 111) to receive configuration from a participant system (e.g., 121) a user experience for configuring consensus-based access control can be improved, as compared to configuring access control directly using a low-level smart contract interface. In some implementations, the user interface is a graphical user interface that displays smart contracts that can be configured, and functions for each smart contract. By displaying available functions for a smart contract, a participant does not have to query a blockchain, or review smart contract source code, to identify smart contract functions that can be configured for consensus-based access control. In variants, the user interface filters the list of smart contracts and functions that are displayed, based on one or more parameters. For example, the user interface can display only smart contracts and functions that can be configured by a user that is currently accessing the user interface. In some implementations, the user interface can perform input validation to validate configuration information input by a user.

In variants, voters and admins can be different entities, and voters and admins can have different privileges. In some implementations, admins can define configuration information for a smart contract function (for which the admin has admin privileges), which includes identifying eligible voters. While eligible voters can propose function calls, vote on function calls, and trigger execution of function calls, voters cannot define smart contract configuration information (e.g., add or remove voters). In this manner, protection is provided against a threat of voters colluding to add more malicious voters.

Configuring consensus-based access control S212 (e.g., in FIG. 2B) can include specifying configuration information for at least one smart contract function. Specifying configuration information can include one or more of: adding eligible voters for voting for proposals to call a smart contract function, removing eligible voters, and setting a number of eligible votes required to execute a smart contract function. However, other configuration actions can be performed.

Adding an eligible voter for a smart contract function includes identifying at least one participant that can vote for a proposal to execute the function. Participants can be identified by one or more of: a blockchain address, a digital signature, authentication credentials, a security token, etc. However, participants can otherwise be identified. Eligible voters can include smart contracts or applications that can vote for proposals, as well as human individuals. Functions implemented by smart contract voters can themselves be configured for consensus-based access control by using smart contract administration system 110.

Voters are specific to a given function in a given contract. Adding an eligible voter includes identifying an address of the smart contract, a function identifier for the function, and a list of one or more voter addresses. In some implementations, each function is identified by using a four-byte identifier that is derived by hashing the function's signature. In an example, an Ethereum cryptographic hash function (e.g., Keccak256) is used to hash the function's signature. However, any suitable hash function can be used.

However, functions can otherwise be identified. In variants, only an administrator that is authorized to configure the function can add eligible voters for the function. In an example, a single voter can be configured for a function, however, several voters are preferably added to provide consensus-based access control.

Similarly, removing an eligible voter for a smart contract function includes identifying at least one blockchain address to be removed as a voter for the function. Removing an eligible voter includes identifying an address of the smart contract, a function identifier for the function, and a list of one or more voter addresses to be removed. In variants, only an administrator that is authorized to configure the function can remove eligible voters for the function.

Setting a number of eligible votes required to execute a smart contract function can include identifying an address of the smart contract, a function identifier for the function, and the minimum number of eligible votes. In some implementations, the minimum number of eligible votes can be any number greater than zero. In variants, only an administrator that is authorized to configure the function can set the number of eligible votes for the function.

In variants, configuration information for a smart contract function can be queried. In some implementations, smart contract administration system 110 can query configuration information for a smart contract function to determine if a blockchain address is an eligible voter for the function. Additionally, or alternatively, smart contract administration system 110 can query configuration information for a smart contract function to identify a minimum number of votes required to execute the function.

Figure 4:
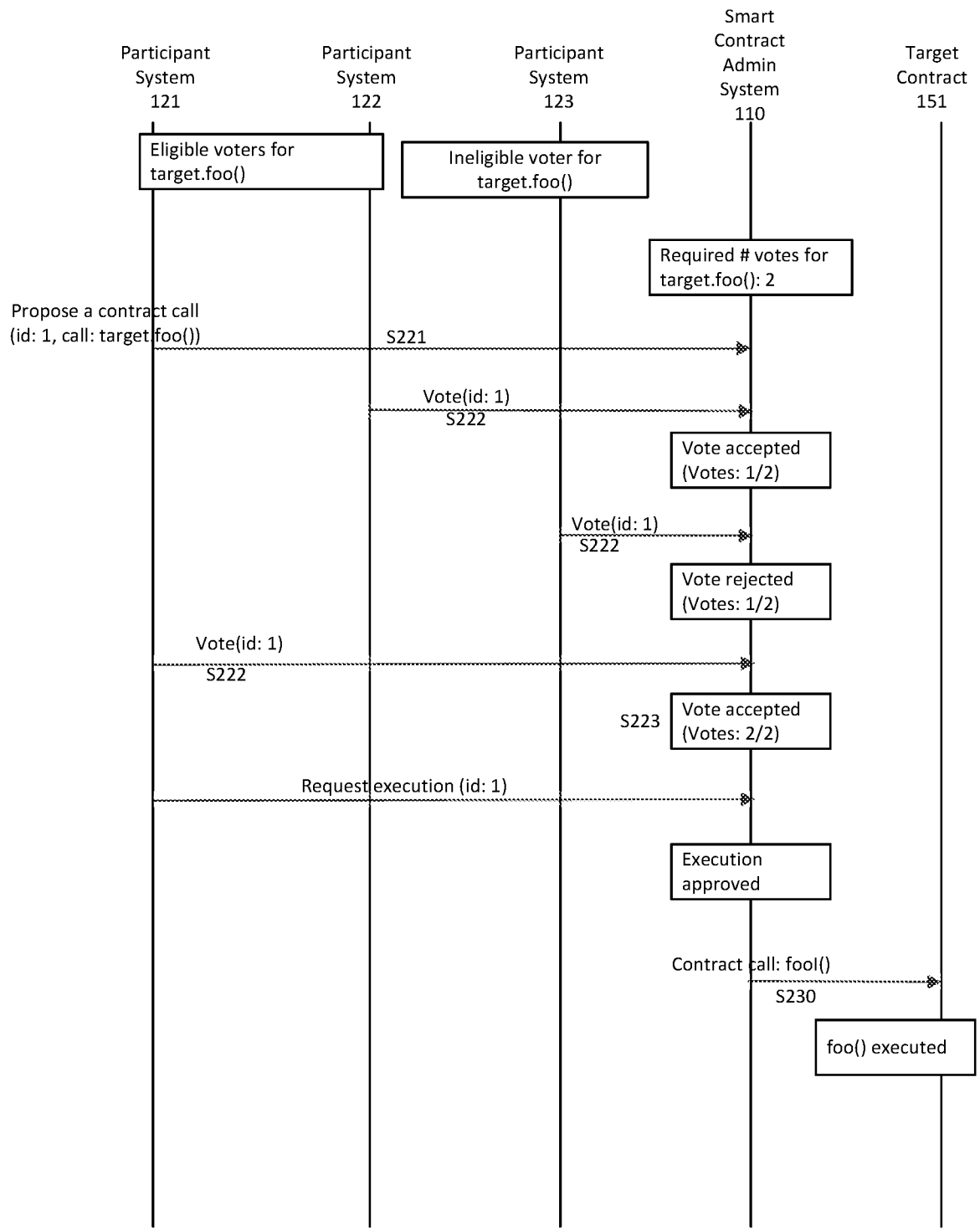
FIG. 4 is a representation of proposal and voting, in accordance with various embodiments.

Determining consensus for function execution S220 can include determining whether a smart contract function can be executed (example shown in FIG. 2C). In an implementation, consensus is determined individually for each function. Determining consensus can include proposing function execution S221, voting for a proposed function execution S222, and determining if a required number of eligible votes has been received S223. An example of consensus determination is shown in FIG. 4 as discussed further below.

Proposal and voting can be performed on-line or off-line, and synchronously or asynchronously. In variants, proposal and voting can be performed by using participant devices (e.g., 121-123) that communicate with smart contract administration system 110 via a public network connection (e.g., the Internet). Additionally, or alternatively, one or more participant systems can communicate with smart contract administration system 110 via a private network connection.

In variants, proposals are performed at predetermined times. Alternatively, proposals can be performed at any suitable time, such as when a proposer decides to submit a proposal.

In a first example, all participants are present in a secure environment, and access respective participant systems in the secure environment. In a second example, participants can be located in various geographic locations, and each participant can communicate their vote in an asynchronous manner (e.g., when they are ready to vote, when they are present at their participant system, when they have network access, etc.).

A participant (e.g., operating or controlling a participant system 121-123) can propose function execution via an interface (e.g., 111). In variants in which smart contract administration system 110 includes an admin smart contract 112, a participant can interface with the admin smart contract 112 directly to propose function execution. For example, the participant's participant system (e.g., 121) can submit a signed transaction that invokes a propose( ) function of the admin smart contract 112. In some implementations, the proposer uses gas to invoke the propose( ) function. Arguments to the propose( ) function can identify the function, the smart contract, and the function arguments to be used during execution of the function. In an example, participants can be users operating participant systems, or automated systems (e.g., other smart contracts).

Proposing function execution includes identifying an address of the smart contract, a function identifier for the function, and optionally argument (parameter) data for the execution of the function. In variants, the argument data is encoded using ABI-Encoding. In some implementations, smart contract administration system 110 generates a proposal identifier for each proposed function execution. In some implementations, the proposal ID is a unique, sequential identifier. In an example, the proposal ID is generated (and emitted) when the propose( ) function of the admin contract 112 is executed.

In some variations, an identifier of the proposer is recorded for the proposal. In variants, only an eligible voter for the function is authorized to propose execution of the function.

In some implementations, smart contract administration system no performs authentication and/or validity checks before processing a proposal. As an example, smart contract administration system 110 can authenticate the proposer as a valid proposer for the function. As another example, smart contract administration system no can determine whether the proposal has been submitted during a valid proposal submission period (e.g., during a time window in which proposals can be made). For example, proposals can only be accepted at pre-scheduled times (e.g., during pre-specified administration meetings).

In variants, after function execution is proposed, a voting proposal notification is sent to each eligible voter. The voting proposal notification can identify the proposal identifier generated for the proposal. The voting proposal notification is preferably an off-chain notification (e.g., email, push notification, app notification, web notification, SMS, etc.), but can alternatively be an on-chain notification (e.g., detection of the blockchain event associated with the proposal, detecting that a transaction associated with a transaction hash for the proposal transaction has been mined, etc.) or other notification. The voting proposal notification can be sent by the smart contract administration system, by an offchain orchestration system, and/or by any other suitable system. Additionally or alternatively, the voters (e.g., users) can monitor the blockchain (e.g., monitor the admin smart contract's events, etc.) to determine whether subsequent action (e.g., message generation and signing) is needed from them. However, the voters can be otherwise notified.

In some variations, the proposer can close a proposal without executing the function. In variants, only the proposer can close a proposal. A request to close a proposal identifies the proposal ID generated for the proposal.

In some implementations, a proposal for function execution is a vote for the proposal. Alternatively, a proposal for function execution is not a vote, and the proposer must explicitly vote for the proposal.

Voting for a proposed function execution S222 can include receiving votes from one or more eligible voters for the proposed function execution. Votes can be received directly by a smart contract (e.g., 112) of smart contract administration system 110, or indirectly via an interface (e.g., 111). In variants, each vote is a message (or API call, or signed blockchain transaction, example of which is shown in FIG. 5) that identifies the voter and the proposal ID for the function execution being proposed. In some implementations, a vote is a signed blockchain transaction that invokes a vote( ) function of the admin smart contract 112. In some implementations, the voter uses gas to invoke the vote( ) function. In an example, the proposal ID is the sole argument for the vote( ) function. In variants, the vote blockchain transaction is signed by using a signing key of the participant that is performing the voting. The signing key can be secured in any suitable manner (e.g., using hardware security modules, cold storage, multi-signature, multi-party computation, etc.).

In variants, voters can be identified by one or more of: a blockchain address, a digital signature, authentication credentials, a security token, etc. However, voters can be otherwise identified. Smart contract administration system 110 can determine if a voter is an eligible voter for the proposal by retrieving the configuration information for the function associated with the proposal ID. If a vote is received from an in-eligible participant, then the vote is rejected. In variants, the proposer for the proposal can also be an eligible voter.

In some implementations, an eligible voter can rescind their vote by providing a message (or API call, or blockchain transaction) to smart contract administration system 110 (or a component of the admin system, e.g., 111, 112) that identifies the voter and the proposal ID for the vote being rescinded. In some implementations, if the function has already been executed, a vote cannot be rescinded.

In variants, smart contract administration system 110 tracks state for each proposal, including one or more of: the proposal ID, whether the proposed function execution has been performed (isExecuted( )), the current number of votes received (numVotes( )), whether the proposal has received the minimum number or required votes (and thus the associated function can be executed) (isExecutable( )), and identities of voters who have voted for the proposal (hasVoted( )). However, any suitable state information can be recorded for each proposal.

In variants, smart contract administration system 110 tracks proposals for each eligible voter, such that outstanding proposals awaiting votes from an eligible voter can be identified. A participant can submit a query to smart contract administration system 110 to identify proposals awaiting their vote. In some implementations, a participant system can periodically poll smart contract administration system 110 for outstanding proposals requiring a vote from the participant. Additionally, or alternatively, smart contract administration system 110 can send voting reminders for proposals awaiting votes. Voting reminders can be sent to respective participant systems in any suitable manner (e.g., through a notification system, via a user interface, via SMS, e-mail, telephone, etc.).

Determining if a required number of votes has been received S223 for a proposal includes tracking eligible votes for the proposal, and comparing the number of eligible votes received with the minimum number of required votes configured for the associated smart contract function. If the received votes are equal to or greater than the configured minimum number, then the required number of votes has been received.

Executing a function S230 functions to execute a function related to an approved proposal. In variations, any suitable component of smart contract administration system 110 can execute the function. In some implementations, an administration smart contract (e.g., 112) executes the function. In an example, the admin smart contact executes the function by using a CALL opcode (e.g., a CALL Ethereum opcode). In a first variation, any eligible voter for the function can initiate execution of the function. In a second variation, only the proposer can initiate execution of the function. In variants, function execution can be initiated by submitting a signed transaction that invokes an execute( ) function of the admin smart contract 112 (example shown in FIG. 5). In some implementations, the entity executing the function uses gas to invoke the execute( ) function. Arguments to the execute( ) function can identify the proposal ID for the function execution (and optionally arguments for the function).

In a first variation, arguments for the function execution received during proposal (at S221). The arguments are stored for use during function execution at S230. In some implementations, the arguments are stored in an admin smart contract 112. The arguments can be deleted from the admin smart contract 112 after function execution. In some implementations, any gas refunded to the admin smart contact 112 after deletion of the arguments is transferred to the proposer. In a second variation, arguments for function execution are not stored prior to function execution, and arguments for the function are provided during function execution.

In variants, the function for an approved proposal can be executed at any suitable time once the required number of votes has been received. The function can be executed in response to receiving the final vote, in response to receiving a request to execute, or in response to any suitable trigger. In a first example, the function is executed as soon as the corresponding proposal has been approved. In a second example, the function is executed at a later time, e.g., after additional execution criteria is satisfied. For example, the function may be scheduled to be executed at a particular time, after a particular event has been detected, in response to a trigger, etc.

In variants, if only a single vote is required to execute the function, the function can be approved for execution after proposal at S221.

Function execution can include: optionally verifying that the proposal is open and executable, optionally verifying that the target contract is a smart contract, optionally determining the function signature for the target contract's function call (e.g., using Keccak256, the target contract's function call, and the function variables), determining the function selector (e.g., as the selector for the target contract's function, the first 4 bytes of the function signature), and calling the function at the target contract using the function selector (example shown in FIG. 5). Upon receipt, the target contract can verify the admin system's authority to call the function (e.g., based on the msg.sender variable), and execute the function. In this variant, smart contract administration system 110 can not sign the function call. However, the function can be otherwise called at the target contract.

Throughout the method, the admin system (e.g., admin contract) can emit blockchain events upon successful or failed calls (or transaction receipt) to all or a subset of the admin system's functions. This event trail can enable the admin system's activities to be auditable and traceable.

In variants, configuration S210, consensus determination S220, and function execution S230 performed by smart contract administration system 110 is logged by smart contract administration system 110 and used to generate auditing information. In some implementations, events can be generated and provided for one or more processes performed by the method 200.

FIG. 4 is a representation of proposal and voting, in accordance with various embodiments. In particular, an example of consensus determination for a given function provided by a target contract is shown in FIG. 4.

As discussed before, configuring access control S210 can include configuring consensus-based access control at the smart contract administration system 110. Consensus-based access control can be configured for one or more target smart contracts (e.g., 151-153). The target smart contracts can be executed by the same blockchain, or executed by a plurality of blockchains. Target smart contracts can implement one or more functions, and consensuses-based access control can be configured for any smart contract function.

In the example of FIG. 4, participant system 121 and participant system 122 correspond to eligible voters for a function call of target.foo( ) provided by target contract 151, and participant system 121 corresponds to an ineligible voter for the function call of target.foo( ). As further shown, the smart contract administration system 110 includes a configuration that a required number of votes for the function call target.foo( ) is a threshold number equivalent to 2 votes.

As shown, the participant system 121 proposes a contract call for the function call of target.foo( ) S221, which is sent to the smart contract administration system 110. The participant system 122 sends a vote for the function call S222 to the smart contract administration system 110, which is then accepted by the smart contract administration system 110.

The participant system 123 also sends a vote for the function call S222 to the smart contract administration system 110, which is then rejected by the smart contract administration system 110.

Next, the participant system 121 sends a vote for the function call S222 to the smart contract administration system 110, which is then accepted by the smart contract administration system 110.

After the threshold number of votes is met, the participant system 121 sends a request to execute the function call of target.foo( ) to the smart contract administration system 110, which is then approved by the smart contract administration system 110.

As further shown in FIG. 4, the smart contract administration system 110 then invokes the function call of target.foo( ) to the target contract 151, which in turn executes the foo( ) function.

FIG. 5 is a schematic representation of an example of proposal, voting, and voting execution, in accordance with various embodiments.

In the example of FIG. 5, the smart contract administration system 110 is assigned to at least one role of the target smart contract as a participant (e.g., by using a smart contract address of smart contract administration system 110, by using a signing public key of smart contract administration system 110, etc.). In some implementations, smart contract administration system 110 can automatically execute target smart contract functions that are assigned the admin system's role at the target smart contract, such as, for example, executing a function periodically, in accordance with rules, in response to a request, in response to one or more triggers, or at any other suitable time.

In the example of FIG. 5, the smart contract administration system 110 generates a configuration transaction (e.g., by specifying configuration information for at least one smart contract function). One or more of user devices (e.g., one or more of a participant system corresponding to 121-123) sign the configuration transaction S502.

The admin smart contract (e.g., the admin smart contract 112 that is on-chain, also referred to as "first smart contract" further below in FIG. 6) verifies the signature S504. Next, the admin smart contract verifies that the user is an administrator based on the user address S506. The admin smart contract then updates configurations S508. In some implementations, the admin smart contract modifies a particular configuration of a particular smart contract (e.g., the target smart contract), the modifying including one or more of changing authorized addresses, a minimum number of authorized addresses that signatures are needed from, the target smart contract, or the function of the target smart contract. The admin smart contract emits a blockchain event S510 indicating that the configuration was updated.

As further shown, the admin smart contract address is assigned to the target smart contract function's role S211 (e.g., as part of configuring the role of the target smart contract) in some implementations.

In an implementation, the smart contract administration system 110 generates an unsigned proposal transaction S512 as further shown in FIG. 5. One or more of user devices (e.g., one or more of a participant system corresponding to 121-123) sign the proposal transaction S514.

The admin smart contract (e.g., the admin smart contract 112) verifies the signature S516. Next, the admin smart contract verifies that the user is an approver for the given type of contract call based on user address S518. The admin smart contract then adds the proposal transaction S520. The admin smart contract emits a blockchain event S522 indicating that the proposal transaction was added.

As mentioned before, determining consensus for function execution can include determining whether a smart contract function can be executed. In an implementation, consensus is determined individually for each function. Determining consensus can include proposing function execution as discussed above, voting for a proposed function execution, and determining if a required number of eligible votes has been received, which is discussed further below.

As shown in FIG. 5, the smart contract administration system 110 generates an unsigned approval transaction for proposal S220. One or more of user devices (e.g., one or more of a participant system corresponding to 121-123) sign the approval transaction S524.

The admin smart contract (e.g., the admin smart contract 112) verifies the signature S526. Next, the admin smart contract verifies that the user is an approver for the proposal S528. The admin smart contract then adds the approval to the proposal S530. The admin smart contract emits a blockchain event S532 indicating that the approval was added to the proposal.

As also shown in FIG. 5, the smart contract administration system 110 generates an unsigned execute transaction for proposal S534. One or more of user devices (e.g., one or more of a participant system corresponding to 121-123) sign the execute transaction S536.

The admin smart contract (e.g., the admin smart contract 112) verifies the signature S538. Next, the admin smart contract verifies that the user is an approver for the proposal S528. The admin smart contract then verifies that a minimum number of approvals met for proposal (e.g., whether a required number of eligible votes has been received) S223. In an embodiment, the admin smart contract verifies that the target contract is a smart contract S540. Next, the admin smart contract generates a function signature for the target contract S230. The admin smart contract then determines a function selector for the target contract. The target contract, in an embodiment, verifies the admin smart contract S544. The target contract then executes the function S546. Further, the admin smart contract emits a blockchain event S548 indicating that the function has been executed.

Variants of the method can include: deploying a first smart contract to a blockchain network, wherein the first smart contract is configured to execute a first smart contract function when a set of execution conditions, associated with the first smart contract function, are met; orchestrating generation of signed blockchain messages to call the admin smart contract function; and optionally orchestrating signed blockchain message transmission to the blockchain, wherein the first smart contract receives the set of signed blockchain messages, verifies that the set of signed blockchain messages satisfy the execution conditions associated with the first smart contract function, and executes the first smart contract function (e.g., via an on-chain transaction) when the associated execution conditions are satisfied. The first smart contract function is preferably an invocation of a target smart contract function of another smart contract on the blockchain, but can alternatively be an autogenous function (e.g., to change the administrators of the first contract) or other function. The execution conditions can include: receiving a threshold number of signed blockchain messages (e.g., that identify the first smart contract function) from a set of authorized blockchain addresses (e.g., authorized for the first smart contract function) and/or other conditions. Orchestrating generation of signed blockchain messages to call the admin smart contract function can include: generating unsigned blockchain messages calling the admin smart contract function (e.g., for the authorized addresses) and sending the unsigned messages to the users associated with authorized addresses (authorized users), and optionally unauthorized users, for signature with the users' respective private key(s) associated with the authorized addresses (e.g., wherein the users can access the unsigned messages using user credentials, multifactor authentication, and/or other security or authentication methods); notifying the authorized users to generate and/or sign blockchain messages calling the admin smart contract function; or otherwise orchestrating signed blockchain message generation. Orchestrating signed blockchain message transmission to the blockchain can include: notifying the users to broadcast the signed blockchain messages to the blockchain; aggregating the signed blockchain messages off-chain, then broadcasting the aggregated signed blockchain messages to the blockchain; and/or otherwise orchestrating message transmission. First smart contract processing of the signed blockchain messages, target smart contract function calling, and target smart contract function execution are preferably atomic (e.g., within a single mined block), but can alternatively be distributed across multiple blocks. Target smart contract function execution (e.g., verifying that the first smart contract is an authorized caller or address, verifying that sufficient gas or processing fees have been paid, etc.) can be within the same blockchain block as the first smart contract function execution or in a different blockchain block.

Figure 6:
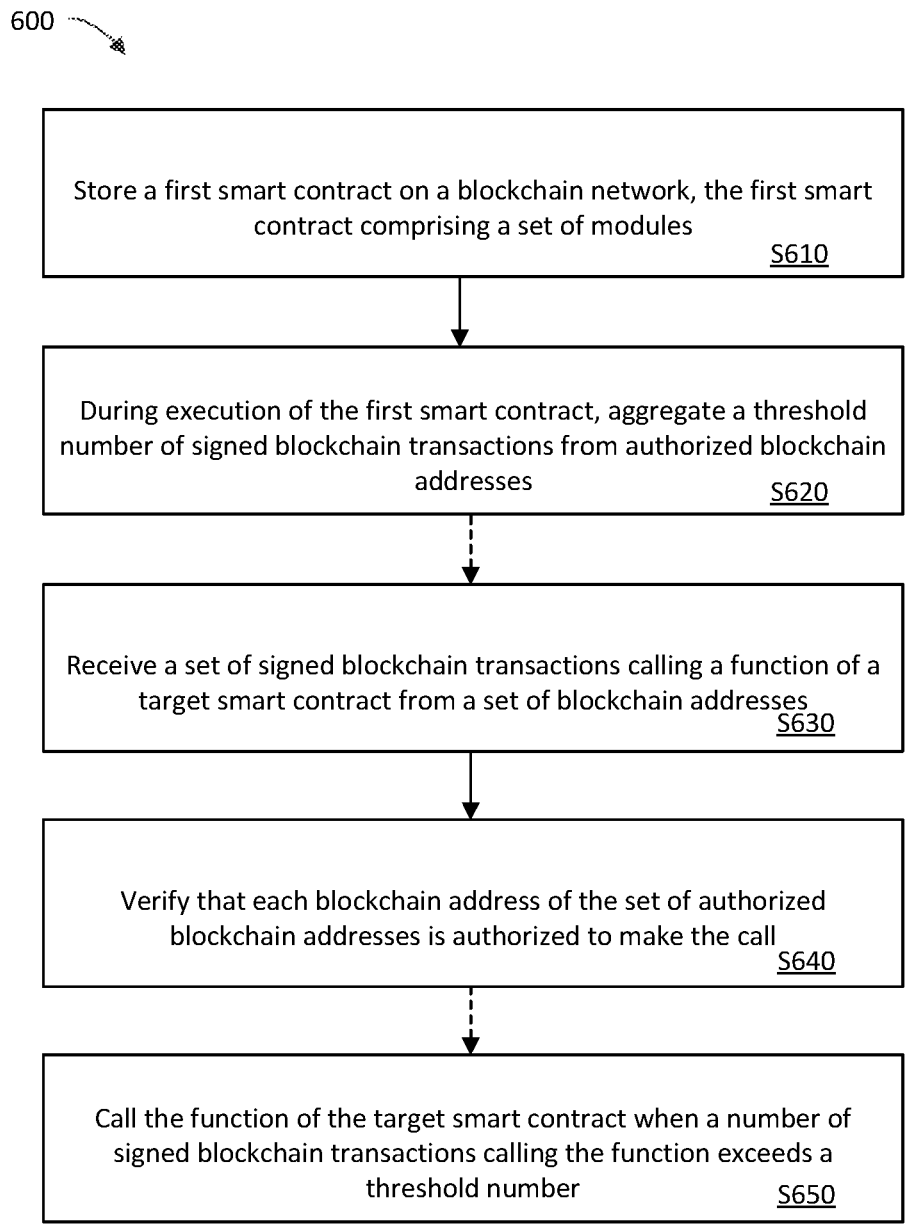
FIG. 6 is a schematic representation of an example method, in accordance with various embodiments.

FIG. 6 is a schematic representation of an example 600 of the method, in accordance with various embodiments.

The method boo can include one or more of: deploying a first smart contract to a blockchain network S610, wherein the first smart contract is stored and executed on the blockchain network, and wherein the first smart contract is configured to: aggregate a threshold number of signed blockchain transactions from authorized blockchain addresses associated with a function of a target smart contract S620 (e.g., by receiving a set of signed blockchain transactions calling a function of a target smart contract from a set of blockchain addresses S630; and verifying that each blockchain address of the set of authorized blockchain addresses is authorized to make the call S640); and calling the function of the target smart contract, using an on-chain transaction, when a number of signed blockchain transactions from authorized blockchain addresses calling the function satisfies a threshold number S650. At least one component of the system can perform at least a portion of the method. In some implementations, each module (e.g., admin smart contract function) is associated with a set of authorized blockchain addresses, and each module can control a functionality of a target smart contract (e.g., different or the same target smart contract functionality) when signed transactions are received from a threshold number of authorized blockchain addresses from the set of authorized blockchain addresses.

In one or more implementations, each module includes a different configuration related to a particular threshold number to enable execution of a particular function. Moreover, in an example, a first module includes a first configuration comprising a first threshold corresponding to an unanimous vote count based on the authorized blockchain addresses from the set of authorized blockchain addresses (e.g., N signed messages required from the N blockchain addresses authorized for the module), and a second module includes a second configuration comprising a second threshold corresponding to a different number than the unanimous vote (e.g., less than M signed messages required from the M blockchain addresses authorized for the module). In variants, the first smart contract controls multiple target smart contracts.

In variants, the method boo further includes: detecting, at a node, a blockchain event associated with the function of the target smart contract; generating a signed blockchain transaction calling a function of the target smart contract, where the signed blockchain transaction is signed with a private key associated with a blockchain address; and broadcasting, by the node, the signed blockchain transaction to the blockchain network.

In some implementations, the method boo also includes: receiving, by the first smart contract, a signed proposed transaction, the signed proposed transaction including a function call and associated with a first user; and verifying, using the set of authorized blockchain addresses, a blockchain address of a user associated with the signed proposed transaction. In response to verifying the blockchain address, the method boo includes: emitting a blockchain event indicating an invitation to vote to approve the signed proposed transaction, the blockchain event being received by at least one different blockchain address corresponding to a different user than the first user; receiving, by the first smart contract, an approval transaction to approve the signed proposed transaction, the approval transaction associated with a different blockchain address and the different user, the different user generating and signing the approval transaction; verifying, by the first smart contract, the approval transaction associated with the different blockchain address, the verifying comprising verifying that the different blockchain address associated with the different user is authorized to make the function call, where verifying the approval transaction further comprises: verifying, by the first smart contract, that a first configuration specified in the approval transaction matches a second configuration included in the signed proposed transaction.

In some implementations, the method boo also includes: generating, by the first smart contract, a blockchain transaction calling a function of the target smart contract; and broadcasting a blockchain transaction to the blockchain network for executing the target smart contract, where executing the target smart contract occurs in an atomic manner within a same block of the blockchain network.

In another example, the method is performed using a first smart contract including a plurality of modules (e.g., admin smart contract functions), wherein each module is associated with a different configuration. Each configuration can include: a set of authorized blockchain addresses, a threshold number of signed transactions required to execute the respective module, a target smart contract associated with the module, a target smart contract function (e.g., function signature of said function) associated with the module, execution logic (e.g., execution approval logic, such as proposal required before approval is possible; a cancellation period must expire before the module functionality can be executed; etc.), and/or other parameters.

The first smart contract can control multiple target smart contracts, or control a single target smart contract. For example, the first smart contract can include different modules for different target smart contracts, different modules for different functions of different target smart contracts, a common module for similar functions of different target smart contracts (e.g., wherein the target smart contract can be identified by the signed transactions calling the module, such as by using a hash of the target smart contract address), and/or otherwise control different target smart contracts.

In this example, the method can include: at a module of the first smart contract, receiving at least the threshold number of signed transactions from blockchain addresses within the set of authorized blockchain addresses for the module; and executing a function of a target smart contract associated with the module when at least the threshold number of signed transactions is received. The signed transaction can: identify the module (e.g., by a function signature, function hash, etc.), include values for arguments of the function of the target smart contract (e.g., wherein the module uses the values when executing the function), and/or other information.

In this example, the method discussed above can be repeated by other modules of the first smart contract, wherein the other modules are associated with different sets of authorized blockchain addresses, different threshold numbers of signed transactions required to execute the second module, and optionally functions for different target smart contracts.

In this example, the module discussed above can include: a proposal configuration including a first set of authorized blockchain addresses to propose module execution and a first threshold number of signed transactions required to propose module execution; and an authorization configuration including a second set of authorized blockchain addresses to authorize module execution and a second threshold number of signed transactions required to authorize module execution. In this specific example, proposal configuration satisfaction is required to propose module execution, authorization configuration satisfaction is required to authorize module execution, and the function of the target smart contract is executed only after module execution is authorized.

In this example, the configuration for a given module can be changed by another module (e.g., using a similar execution approval mechanism or different execution approval mechanism), the module itself, or otherwise changed. For example, the method can optionally further include: at a second module of the plurality of modules, receiving at least a second threshold number of secondary signed transactions from a set of authorized blockchain addresses for the second module, wherein the secondary signed transactions are associated with new configurations for the first module; and changing the configuration for the module when at least the second threshold number of secondary signed transactions is received. However, the method can be otherwise performed.

Embodiments of the system and/or method can include every combination and permutation of the various system components and the various method processes, where one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A method comprising:
receiving, by a caller smart contract having different configurations related to one or more target smart contracts, first signed transactions indicating a first target smart contract to be executed, the caller smart contract comprising (i) a first configuration comprising a first set of authorized blockchain addresses and a first threshold number of two or more signed transactions and (ii) a second configuration comprising a second set of authorized blockchain addresses and a second threshold number of signed transactions different from the first threshold number;
performing, by the caller smart contract, verification indicating that the first signed transactions are from authorized addresses of the first set and the first signed transactions satisfy the first threshold number; and
after the caller smart contract receives the first signed transactions, invoking, by the caller smart contract, execution of a first function of the first target smart contract based on the first configuration corresponding to the first target smart contract, the first signed transactions being from authorized addresses of the first set, and the first signed transactions satisfying the first threshold number.

2. The method of claim 1, further comprising:
receiving, via the caller smart contract, a set of signed transactions indicating a threshold configuration change to the first threshold number of the first configuration;
determining, via the caller smart contract, that the second configuration corresponds to implementing the threshold configuration change, the set of signed transactions are from authorized addresses of the second set, and the set of signed transactions satisfy the second threshold number; and
causing, without modifying code of the first target smart contract, modification of the first threshold number of the first configuration to an updated threshold number based on the second configuration corresponding to implementing the threshold configuration change, the set of signed transactions being from authorized addresses of the second set, and the set of signed transactions satisfying the second threshold number.

3. The method of claim 2, wherein:
receiving the first signed transactions comprises receiving, via the caller smart contract, the first signed transactions after the modification of the first threshold number of the first configuration to the updated threshold number; and
executing the first function of the first target smart contract comprises executing the first function of the first target smart contract based on the first configuration corresponding to the first target smart contract, the first signed transactions being from authorized addresses of the first set, and the first signed transactions satisfying the updated threshold number.

4. The method of claim 1, further comprising:
receiving, via the caller smart contract, a set of signed transactions indicating a configuration change to the first set of authorized blockchain addresses of the first configuration;
determining, via the caller smart contract, that the second configuration corresponds to implementing the configuration change, the set of signed transactions are from authorized addresses of the second set, and the set of signed transactions satisfy the second threshold number; and
causing, without modifying code of the first target smart contract, the smart contract to add authorized address to, or remove authorized addresses from, the first set of authorized blockchain addresses of the first configuration, the smart contract performing the adding or the removing based on the second configuration corresponding to implementing the configuration change, the set of signed transactions being from authorized addresses of the second set, and the set of signed transactions satisfying the second threshold number.

5. The method of claim 1, wherein invoking the execution of the first function of the first target smart contract comprises using, by the caller smart contract, a call opcode and a hash-based value derived from a signature of the first function to execute the first function of the first target smart contract.

6. The method of claim 1, wherein receiving the first signed transactions comprises receiving, via the caller smart contract, the first signed transactions from one or more devices in response to the one or more devices detecting a transaction hash of an on-chain proposal event.

7. The method of claim 6, further comprising:
broadcasting, via the caller smart contract, a proposal transaction to a blockchain network to cause the proposal transaction to be recorded as the on-chain proposal event.

8. The method of claim 1, wherein the first configuration of the caller smart contract comprises a first threshold percentage of authorized addresses of the first set as the first threshold number, and the second configuration of the caller smart contract comprises a second threshold percentage of authorized addresses of the second set as the second threshold number.

9. A system comprising:
one or more processors and non-transitory computer-readable media storing instructions that, when executed by the one or more processors, cause operations comprising:
accessing a smart contract having (i) a first configuration comprising a first set of authorized blockchain addresses and a first threshold number of two or more signed transactions and (ii) a second configuration comprising a second set of authorized blockchain addresses and a second threshold number of signed transactions different from the first threshold number;
receiving, by the smart contract, first signed transactions indicating a first target smart contract to be executed;
performing, by the smart contract, verification indicating that the first signed transactions are from authorized addresses of the first set and the first signed transactions satisfy the first threshold number; and
invoking, by the smart contract, execution of a first function of the first target smart contract based on the first configuration corresponding to the first target smart contract, the first signed transactions being from authorized addresses of the first set, and the first signed transactions satisfying the first threshold number.

10. The system of claim 9, the operations further comprising:
receiving, via the smart contract, a set of signed transactions indicating a threshold configuration change to the first threshold number of the first configuration;
determining, via the smart contract, that the second configuration corresponds to implementing the threshold configuration change, the set of signed transactions are from authorized addresses of the second set, and the set of signed transactions satisfy the second threshold number; and
causing modification of the first threshold number of the first configuration to an updated threshold number based on the second configuration corresponding to implementing the threshold configuration change, the set of signed transactions being from authorized addresses of the second set, and the set of signed transactions satisfying the second threshold number.

11. The system of claim 9, the operations further comprising:
receiving, via the smart contract, a set of signed transactions indicating a configuration change to the first set of authorized blockchain addresses of the first configuration;
determining, via the smart contract, that the second configuration corresponds to implementing the configuration change, the set of signed transactions are from authorized addresses of the second set, and the set of signed transactions satisfy the second threshold number; and
causing modification of the first set of authorized blockchain addresses of the first configuration based on the second configuration corresponding to implementing the configuration change, the set of signed transactions being from authorized addresses of the second set, and the set of signed transactions satisfying the second threshold number.

12. The system of claim 9, wherein invoking the execution of the first function of the first target smart contract comprises using, by the smart contract, a call opcode and a hash-based value derived from a signature of the first function to execute the first function of the first target smart contract.

13. The system of claim 9, wherein receiving the first signed transactions comprises receiving, via the smart contract, the first signed transactions in response to a detection of a transaction hash of an on-chain proposal event.

14. The system of claim 9, wherein the first configuration of the smart contract comprises a first threshold percentage of authorized addresses of the first set as the first threshold number, and the second configuration of the smart contract comprises a second threshold percentage of authorized addresses of the second set as the second threshold number.

15. One or more non-transitory computer-readable media storing instructions that, when executed by one or more processors, cause operations comprising:
receiving, by a smart contract, first signed transactions indicating a first target smart contract to be executed, the smart contract having (i) a first configuration comprising a first set of authorized blockchain addresses and a first threshold number of two or more signed transactions and (ii) a second configuration comprising a second set of authorized blockchain addresses and a second threshold number of signed transactions;
performing, by the smart contract, verification indicating that the first signed transactions are from authorized addresses of the first set and the first signed transactions satisfy the first threshold number; and
invoking, by the smart contract, execution of a first function of the first target smart contract based on the first configuration corresponding to the first target smart contract, the first signed transactions being from authorized addresses of the first set, and the first signed transactions satisfying the first threshold number.

16. The one or more non-transitory computer-readable media of claim 15, the operations further comprising:
receiving, via the smart contract, a set of signed transactions indicating a threshold configuration change to the first threshold number of the first configuration;
determining, via the smart contract, that the second configuration corresponds to implementing the threshold configuration change, the set of signed transactions are from authorized addresses of the second set, and the set of signed transactions satisfy the second threshold number; and
causing modification of the first threshold number of the first configuration to an updated threshold number based on the second configuration corresponding to implementing the threshold configuration change, the set of signed transactions being from authorized addresses of the second set, and the set of signed transactions satisfying the second threshold number.

17. The one or more non-transitory computer-readable media of claim 16, wherein:
receiving the first signed transactions comprises receiving, via the smart contract, the first signed transactions after the modification of the first threshold number of the first configuration to the updated threshold number; and
invoking the execution of the first function of the first target smart contract comprises invoking the execution of the first function of the first target smart contract based on the first configuration corresponding to the first target smart contract, the first signed transactions being from authorized addresses of the first set, and the first signed transactions satisfying the updated threshold number.

18. The one or more non-transitory computer-readable media of claim 15, the operations further comprising:
   receiving, via the smart contract, a set of signed transactions indicating a configuration change to the first set of authorized blockchain addresses of the first configuration;
   determining, via the smart contract, that the second configuration corresponds to implementing the configuration change, the set of signed transactions are from authorized addresses of the second set, and the set of signed transactions satisfy the second threshold number; and
   causing modification of the first set of authorized blockchain addresses of the first configuration based on the second configuration corresponding to implementing the configuration change, the set of signed transactions being from authorized addresses of the second set, and the set of signed transactions satisfying the second threshold number.

19. The one or more non-transitory computer-readable media of claim 15, wherein invoking the execution of the first function of the first target smart contract comprises using, by the smart contract, a call opcode and a hash-based value derived from a signature of the first function to execute the first function of the first target smart contract.

20. The one or more non-transitory computer-readable media of claim 15, wherein receiving the first signed transactions comprises receiving, via the smart contract, the first signed transactions in response to a detection of a transaction hash of an on-chain proposal event.

21. The one or more non-transitory computer-readable media of claim 20, the operations further comprising:
   broadcasting, via the smart contract, a proposal transaction to a blockchain network to cause the proposal transaction to be recorded as the on-chain proposal event.

22. The one or more non-transitory computer-readable media of claim 15, wherein the first configuration of the smart contract comprises a first threshold percentage of authorized addresses of the first set as the first threshold number, and the second configuration of the smart contract comprises a second threshold percentage of authorized addresses of the second set as the second threshold number.

* * * * *